United States Patent
Hulteen

[15] 3,663,337
[45] May 16, 1972

[54] METHOD AND APPARATUS FOR MAKING SPIRAL-REEFED PARACHUTES

[72] Inventor: Stanley C. Hulteen, Chancellor, S. Dak.
[73] Assignee: The United States of America as represented by the Secretary of the Army
[22] Filed: Sept. 2, 1970
[21] Appl. No.: 69,075

[52] U.S. Cl.................156/499, 156/556, 156/580, 156/583
[51] Int. Cl............................................B32b 31/00
[58] Field of Search..................156/583, 580, 567, 568, 499

[56] References Cited

UNITED STATES PATENTS

| | | | |
|---|---|---|---|
| 2,656,293 | 10/1953 | Huch | 156/264 |
| 2,703,769 | 3/1955 | Stinger et al. | 156/256 |
| 3,006,801 | 10/1961 | Pfeffer | 156/380 |

*Primary Examiner*—Douglas J. Drummond
*Attorney*—Harry M. Saragovitz, Edward J. Kelly, Herbert Berl and Milton W. Lee

[57] ABSTRACT

A machine assembly for the fabrication of spiral reefed parachutes includes a main turntable, an overhead operated press plate to seal the gore canopy sections, a heating element in the press plate, a manifold to speed up cooling and a jig to attach eyelets to the canopy.

7 Claims, 3 Drawing Figures

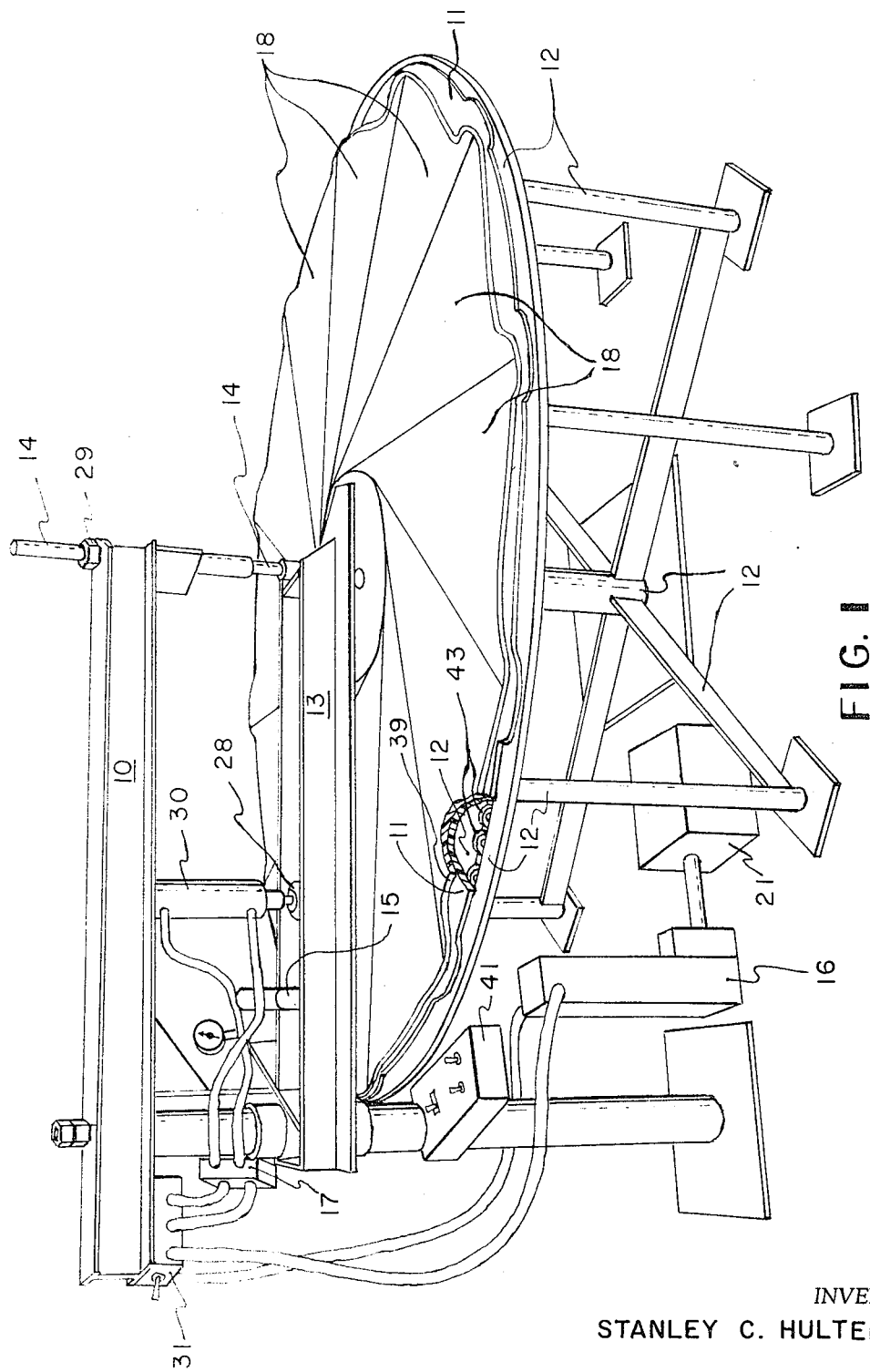

INVENTOR
STANLEY C. HULTEEN

BY Harry M. Saragovitz,
Edward J. Kelly & Herbert Berl
ATTORNEYS

METHOD AND APPARATUS FOR MAKING SPIRAL-REEFED PARACHUTES

BACKGROUND OF INVENTION

This invention relates to co-pending application, Ser. No. 37,076, filed May 14, 1970, entitled, "Spiral Reefed Variable Drag Parachute." The present invention relates to a fabrication tool and in particular to a device for making spiral reefed parachutes. In the past fabrication was done by hand lay up since the spiral-reefed parachute is itself relatively new. This naturally required a large amount of time with attendant high costs. In addition precision was variable and generally low.

SUMMARY

The general purpose of this invention resides in the provision of a production tooling device for the fabrication of spiral-reefed parachutes. The device consists essentially of an indexed turntable upon which are placed all the canopy sections to be assembled. As the turntable is rotated, the edges of adjacent individual canopy sections are pressed and heat sealed with the subsequent application of radial lines with O-rings placed over and attached to the seams.

DESCRIPTION OF DRAWING

The exact nature of the invention will be readily apparent from consideration of the following specification relating to the annexed drawings in which:

FIG. 1 shows a side view, in perspective, of all the main elements of the fabrication device;

DETAILED DESCRIPTION

Figure 3:
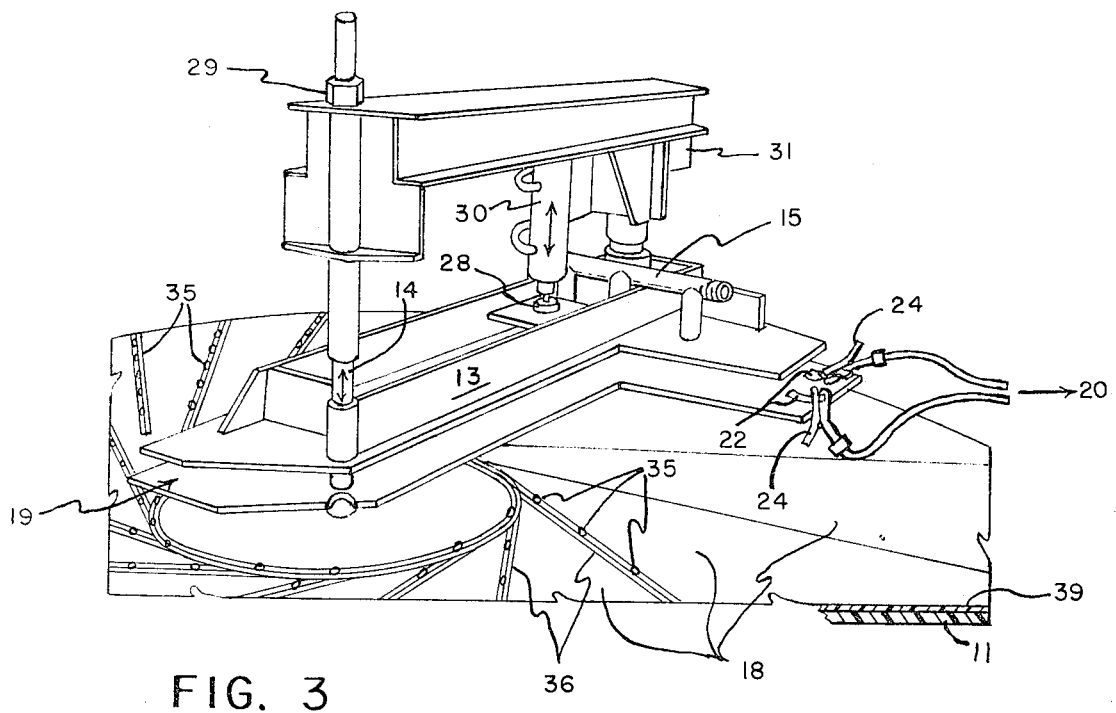
FIG. 3 shows an angled top view, in perspective, of the main elements of the device.
Figure 2:
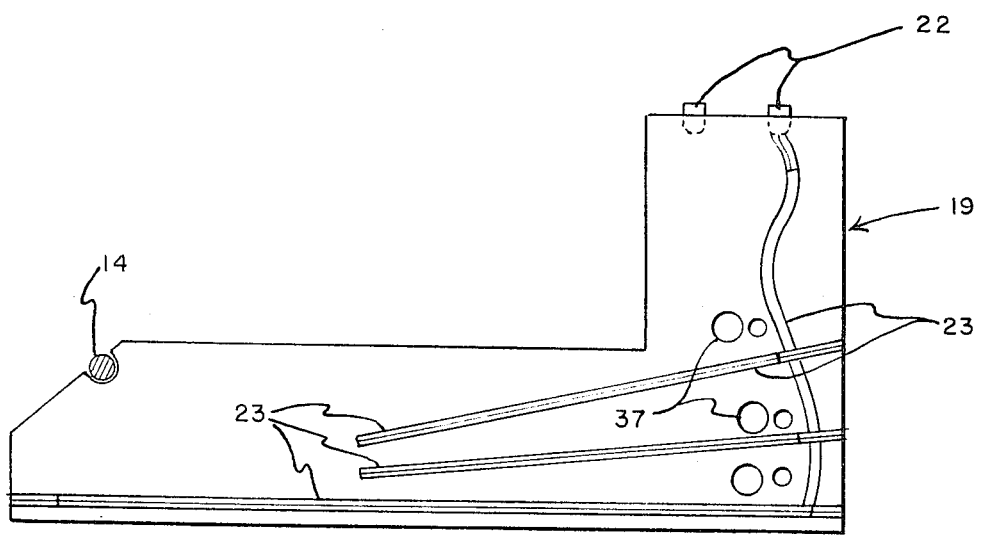
FIG. 2 shows a bottom view of the heater pallet.

Referring now to the drawings wherein like reference characters designate like or corresponding parts throughout the several views, there is shown in FIGS. 1 and 3 an indexed turntable 11 with a laminate backup of neoprene calendered nylon-cork-neoprene foam rubber-cork which rotates between an underlying support structure 12 and an overhead hydraulically operated press plate 13. The structure is designed with an extreme degree of rigidity so that deflection of the press plate and the framework is negligible. The press plate is activated by a hydraulic pump 30, shown in FIGS. 1 and 3 as a cylinder, attached to cantilever support structure 10. Also attached to support structure 10 is a hydraulic control valve 31, simply shown in FIG. 1 as a switch-controlled box. The end of the hydraulic piston is attached via a ball joint 28 to the press plate 13. To insure even pressure distribution the ball joint attachment location is at the heating element area moment centroid. Insurance of conformation of the seal to the heating elements 23 of FIG. 2 is provided by the underlying compressible laminate backup. Heating elements 23 are located within the heater pallet 19 such that upon being placed over the canopy sections, each heating element falls directly over a seam desired to be sealed.

The center post 14 of the press plate is retractable so as to allow insertion of the canopy material 39, as shown in FIG. 3. After insertion of the canopy material (actually the placing of the canopy material on the turntable) and attachment of the canopy material 39 to turntable 11 the post 14 is pinned in place to provide support to the upper framework heater pallet 19 is removed during the placing of the canopy material on the turntable. Attaching the canopy material to the turntable is achieved by any feasible means, such as by fasteners secured to the turntable or by adhesive tape being placed over the edge of the material and extending over onto the turntable. After the canopy sections are properly placed on the turntable, the edges are secured to said turntable such that pressure being applied radially to the canopy sections will not allow the canopy sections to be moved from their desired positions.

A center post lock is provided by nut 29. A manifold 15 shown in FIGS. 1 and 3 is built into the press plate to allow auxiliary cooling of the heater elements 23 (described following) to speed up the cooling cycle. Such cooling reaches the press plate through cooling holes in press plate 13 corresponding to holes 37 of the heater pallet 19 of FIG. 2. Beneath turntable 11 is an electric motor shown as box 21 which powers a pump 16 to provide line pressure to power the hydraulic cylinder of pump 30. A locking valve 17 is used to maintain the line pressure to the cylinder at a constant level during the heating-cooling cycle.

Electrical connection from a power supply 20 having supply leads shown in FIG. 3, via electric control system 41 of FIG. 1, to the heater elements 23 of FIG. 2 is made by attaching clips 24 to terminals 22 on the heater pallet 19 which is positioned between the press plate 13 and the turntable 11 in FIG. 3. Actually heater strips 23 of FIG. 2 contain small holes positioned along the length thereof for later insertion of O-rings.

In addition to the main canopy material 39, the canopy is made up of 12 identical arrangements of radial lines 36 with eyelets as shown at 35, and skirt and apex reinforcements for the bottom and top chute openings respectively. These components are loaded onto the heater-pallets 19 in radial alignment with heating elements 23 by any of several well known methods, such as by an adhesive backing. Several heater-pallets are used alternately so that one can be loaded while the other is going through the heating cycle. The pallets are then placed in one of the 12 indexed positions on the turntable which is then rotated under the index position between the press plate 13 and the underlying support structure 12. The number of indexed positions may vary in accordance with the number of canopy sections employed. Rollers 43 of FIG. 1 allow the table to rotate for this purpose.

A jig (not shown), consisting of a series of post extensions corresponding to the eyelet placements on the radial lines is used to attach by any of several well known methods teflon O-rings 35 to the radial lines 36 before placement onto the heater pallets.

FIG. 2 shows a bottom view of the heater pallet 19 which is removable and rotatable around center post 14. The radial line with eyelets are placed on heater elements 23. When current is applied to clips 22 by a suitable source the radial lines are impregnated or fused onto the main canopy material 39.

The fabrication method used with this fabrication device would be performed as follows:

With the center post 14 and press plate 13 in the lifted position, the 9 foot by 10 foot section of mylar which forms the main canopy material is positioned on the turntable and the outer periphery is taped in place, the center post is lowered and locked, a parachute skirt edge reinforcement mylar backed adhesive tape is positioned and lightly spot sealed in place by hand iron, the radial line with teflon O-rings is assembled on the radial line/eyelet jigs (not shown). Tape is positioned on the heater elements with the adhesive side facing away from the heater element. The radial line with attached teflon O-rings is placed over the tape. Prior to inserting the O-ring into the slotted hole in the heater strips, a small incision is made in the mylar tape to allow passage of the O-ring. The tape and line at the extremities of the pallet are brought up and over and are held in place by tape at the top edge of the pallet. The loaded pallet is positioned on the turntable. A pin is inserted through the left corner of the pallet into the turntable. This assures that the pallet is, and will remain, in correct alignment with the turntable. The turntable with loaded pallet in place is rotated under the press plate and the hydraulic press is activated to a 1,000 psi line pressure. Connections from the power supply to heater element terminals are made. The heating time is 3 minutes and the cooling approximately 5 minutes. After the heating/cooling cycle is finished the press is raised and the turntable rotated back to a pallet removal/pallet insertion position. The indexing pin is removed from the pallet and turntable. The pallet is removed from the turntable and placed back on the table for reloading. The 2 foot diameter circle is removed from the apex of the canopy. The excess material surrounding the canopy skirt is cut, freeing the canopy from the turntable.

It should be understood that the foregoing disclosure relates to only a preferred embodiment of the invention and that modification may be made therein without departing from the scope of the invention as set forth in the appended claims.

I claim:

1. A fabrication device for spiral reefed parachutes comprising:
   a rotatable indexed turntable
   a hydraulic press plate positioned over said turntable,
   a heating pallet positioned between said press plate and said turntable,
   hydraulic power means for activating said press plate, and
   electric power means to supply power to said heating pallet.
2. The apparatus of claim 1 in which:
   said turntable is provided with a compressible laminate backup material, and
   said turntable is rotatable on rollers located on its periphery.
3. The device of claim 1 in which:
   said heating pallet consists of heating elements on its undersurface arranged in a pattern for the purpose of impregnating radial lines on a parachute canopy material.
4. The device of claim 3 in which said heating pallet is provided with clips to which an electric power source can be attached.
5. The device of claim 3 in which:
   said turntable is provided with a compressible laminate backup material, and said turntable is rotatable on rollers located on its periphery.
6. The device of claim 5 in which; said hydraulic press is provided with a cooling manifold to dissipate heat from the press plate after a heating cycle.
7. A method of fabricating a spiral reefed parachute which comprises:
   placing the parachute canopy material on a turntable,
   positioning a parachute skirt edge reinforcement in place,
   assembling radial lines with O-rings on jigs,
   positioning tape on heater elements of a heating pallet,
   placing the assembled radial lines over said tape,
   placing said heating pallet on the turntable over the canopy material,
   activating a hydraulic press located over the heating pallet,
   connecting a power supply to the heating pallet, and
   heating the pallet by activating the power supply controls.

* * * * *